US012720012B2

(12) United States Patent
Zatvornytskyi et al.

(10) Patent No.: US 12,720,012 B2
(45) Date of Patent: Aug. 25, 2026

(54) VIDEO SURVEILLANCE SYSTEM USING VISUAL TRAIL MAPPING

(71) Applicant: MILESTONE SYSTEMS A/S, Brøndby (DK)

(72) Inventors: Oleksii Zatvornytskyi, Brøndby (DK); Peter Posselt Vergmann, Brøndby (DK)

(73) Assignee: MILESTONE SYSTEMS A/S, Brøndby (DK)

(*) Notice: Subject to any disclaimer, the term of this patent is extended or adjusted under 35 U.S.C. 154(b) by 141 days.

(21) Appl. No.: 18/434,494

(22) Filed: Feb. 6, 2024

(65) Prior Publication Data

US 2024/0267493 A1 Aug. 8, 2024

(30) Foreign Application Priority Data

Feb. 7, 2023 (GB) ..................................... 2301680

(51) Int. Cl.

| | |
|---|---|
| ***H04N 7/18*** | (2006.01) |
| ***G01C 21/00*** | (2006.01) |
| ***G06F 3/0481*** | (2022.01) |
| ***G06F 3/04842*** | (2022.01) |
| ***G06F 16/738*** | (2019.01) |
| ***G06F 16/787*** | (2019.01) |
| ***G06V 20/40*** | (2022.01) |
| ***G06V 20/52*** | (2022.01) |

(52) U.S. Cl.

CPC ......... *H04N 7/181* (2013.01); *G01C 21/3811* (2020.08); *G01C 21/3837* (2020.08); *G06F 3/0481* (2013.01); *G06F 3/04842* (2013.01); *G06F 16/738* (2019.01); *G06F 16/787* (2019.01); *G06V 20/41* (2022.01); *G06V 20/52* (2022.01); *G06F 2203/04803* (2013.01); *G06V 2201/07* (2022.01); *G06V 2201/10* (2022.01)

(58) Field of Classification Search

CPC ............. H04N 7/181; H04N 21/21805; H04N 21/472; H04N 21/84; H04N 7/185; G01C 21/3811; G01C 21/3837; G06F 3/0481; G06F 3/04842; G06F 16/738; G06F 16/787; G06F 2203/04803; G06F 16/7335; G06F 3/0482; G06V 20/41; G06V 20/52; G06V 2201/07; G06V 2201/10; G06T 19/006; G06T 2200/24; G06T 2207/10016; G06T 2207/30232; G06T 2207/30236; G06T 2207/30252

See application file for complete search history.

(56) References Cited

U.S. PATENT DOCUMENTS 8,786,630 B2 7/2014 Iwase
8,887,050 B1 * 11/2014 Siracusano, Jr. ..... G06F 3/0481 715/756
12,051,244 B2 * 7/2024 Koh ....................... G11B 27/34

(Continued)

FOREIGN PATENT DOCUMENTS

JP 2018029290 A * 2/2018
WO 2011/096278 A1 8/2011

*Primary Examiner* — Richard A Hansell, Jr.

(74) *Attorney, Agent, or Firm* — Canon U.S.A., Inc. IP Division

(57) ABSTRACT

The present disclosure generally relates to video surveillance systems, video management systems and optionally computer-implemented video management methods that utilize trail mapping of one of movable video cameras onto a geo-map of a surveillance area.

19 Claims, 5 Drawing Sheets

(56) References Cited

U.S. PATENT DOCUMENTS

| | | | | |
|---|---|---|---|---|
| 2010/0205203 | A1* | 8/2010 | Anderson | G06F 16/7837 707/754 |
| 2010/0286859 | A1* | 11/2010 | Feigh | G08G 5/55 701/25 |
| 2010/0305782 | A1* | 12/2010 | Linden | H04N 5/772 396/419 |
| 2010/0321406 | A1* | 12/2010 | Iwase | G11B 27/105 345/638 |
| 2015/0348243 | A1 | 12/2015 | Sutou | |
| 2018/0068189 | A1* | 3/2018 | Daliyot | G06F 3/04842 |
| 2018/0101970 | A1* | 4/2018 | Waniguchi | G06T 11/26 |
| 2018/0322197 | A1* | 11/2018 | Hesterman | B61L 15/0027 |
| 2020/0143135 | A1* | 5/2020 | Kim | G06V 10/30 |
| 2020/0169700 | A1* | 5/2020 | Golan | H04N 7/181 |
| 2020/0413001 | A1* | 12/2020 | Takahashi | H04N 5/77 |
| 2021/0125640 | A1* | 4/2021 | Andersson | H04N 23/695 |
| 2021/0385418 | A1* | 12/2021 | Thomas | H04N 23/698 |
| 2024/0212224 | A1* | 6/2024 | Chu | G06T 7/248 |

* cited by examiner

VIDEO SURVEILLANCE SYSTEM USING VISUAL TRAIL MAPPING

CROSS REFERENCE

This application claims the benefit under 35 U.S.C 119 (a)-(d) of the United Kingdom Patent Application No. 2301680.1, filed on Feb. 7, 2023, and titled "VIDEO SURVEILLANCE SYSTEM USING VISUAL TRAIL MAPPING"; this cited patent application is incorporated herein by reference in its entirety.

TECHNICAL FIELD

The present disclosure generally relates to video surveillance systems, video management systems and optionally computer-implemented video management methods that utilize trail mapping of one of movable video cameras onto a geo-map of a surveillance area.

BACKGROUND

Modern video surveillance systems have evolved into highly complex and often heterogeneous systems comprising a large number of different peripheral devices and computer hardware elements that are tied together via a networked infrastructure and controlled by means of advanced management software. One important component of modern video surveillance systems is a video recording and processing system that allows video streams from one or more video cameras to be received, stored, and processed.

A video management system (VMS), also known as video management software or a video management server, is a component or sub-system of a video surveillance system. The VMS typically provides various video management services, such as one or more of the following: collecting one or more video streams from one or more video cameras, storing the received one or more video streams to a storage device and providing an interface to view the received one or more live video streams and/or to access one or more stored video streams.

Moreover, it is generally desirable that surveillance systems and in particular, VMSs are versatile and can be used in different types of applications which may impose different demands or requirements to processing and displaying received video streams supplied by the one or more video cameras.

A particular challenge to VMSs is to handle and display video streams supplied by moving or movable, i.e. non-stationary, video cameras in a meaningful and intuitive manner to a user e.g. a VMS operator.

SUMMARY

The present disclosure relates to innovative layouts of user interface windows of the VMS using a plurality of trail markers mapped onto a geo-map of a surveillance area. The trail markers may indicate discrete time instants and corresponding geo-positions of the movable video camera along the trail. The user may actuate individual trail markers to get a presentation of corresponding video streams. Hence, the functionality of present user interface windows inter alia addresses and solves the above-outlined challenges by providing meaningful and intuitive user presentations of live or retrieved video streams supplied by movable video cameras.

A first aspect of the present disclosure relates to a VMS, comprising:

a processing unit configured to receive a first video stream and associated first metadata stream supplied by a first movable video camera configured for travelling through a surveillance area. The VMS comprises a user interface window. The VMS may comprise a user screen for presentation of the user interface window or the user screen may be arranged outside the VMS for example on a remote client computer as discussed in further detail below with reference to the appended drawings. The user interface window is configured to present the first video stream. The processing unit is further configured to:

determine a first trail of the first movable video camera within the surveillance area based on geographical position data and corresponding time data of the first metadata stream, generate and display a geo-map of the surveillance area via the user interface window, map the first trail onto the geo-map using a plurality of first trail markers represented by a first type of visual symbols, monitor the plurality of first trail markers for user actuation, for example a mouse click, respond to an actuated first trail marker by displaying the first video stream that corresponds to a geographical position and time instant of the actuated first trail marker.

The geo-map is kept relatively clear because the trail is formed from a plurality of spaced apart individual trail markers; this allows details of the geo-map to still be visible. Put another way, the trail markers that are spaced apart indicate the movable camera trail and limits the obfuscation of map details along the trail. The VMS user is thus able to gain an understanding of the trail taken by the moveable camera while also viewing details of the geo-map along the trail.

The first metadata stream may be supplied by a separate device associated with the first movable camera, for example a GPS unit providing position data for the movable camera.

The first moveable camera may supply camera metadata, such as frame rate, aperture, white balance, camera model, firmware etc.

Preferably, the first metadata stream may be provided by a positioning device associated with or connected to the first video camera. Preferably, the second metadata stream may be provided by a positioning device associated with or connected to the second video camera.

The first metadata stream and the camera metadata may be separate streams but linked, in the sense that the first metadata stream is associated to the camera supplying the camera metadata. In some embodiments, there may be a synchronised timestamp applied, preferably by the video management system upon receipt of the streams.

The VMS may provide the user with intuitive and fast access to locate and investigate incidents and/objects of interest, i.e. target incidents and objects, in live video streams or recorded and retrieved video streams as discussed in further detail below with reference to the appended drawings.

The processing unit may be configured to handle one or more additional movable video cameras in certain embodiments of the video management system. In that case, the processing unit may further be configured to:

receive a second video stream from a second movable video camera configured for travelling through the surveillance area, determine a second trail of the second movable video camera within the surveillance area based on geographical position data and corresponding time data of the second metadata stream, map the second trail onto the geo-map using a plurality of second trail markers represented by a second type of visual symbols, monitor the plurality of second trail markers for user actuation e.g. a mouse click), respond to an actuated second trail marker by displaying the second video stream that corresponds to a geographical position and time instant of the actuated second trail marker.

The first and second types of visual symbols are preferably selected to make a clear and intuitive visual difference to the user. For example may each of first type of visual symbols comprise at least one of a rectangle, a triangle and a circle and each of second type of visual symbols comprise at least one of a rectangle, a triangle and a circle. The visual symbols of the first and second types may for example differ by colour e.g. red versus black and/or by shape like rectangle versus triangle as discussed in further detail below with reference to the appended drawings.

The trail markers may indicate a direction of travel of the movable camera along the trail. Taking triangle markers as an example, the direction of travel may be indicated by one of the points of the triangle. The processing unit may be configured to create numerous different layouts of the user interface window for example depending on the number of video streams for presentation and other visual features associated with a particular VMS. The processing unit may for example be configured to present the first video stream in a first tile of the user interface window and present the second video stream in a second tile of the user interface window. The processing unit may further be configured to present the geo-map in a third tile of the user interface window. This allows the user to access and evaluate visual features on a single window.

The processing unit may in some embodiments be configured to receive a user defined search query, or an automatically generated search query, for identifying at least one of a target object, a target activity and a target incident of the first video stream within the surveillance area. The processing unit thereafter displays the first video stream that corresponds to the at least one of a target object, a target activity and a target incident in the user interface window. The user defined search query may for example identify a particular object or incident, say a target object within a user specified zone or facility of the surveillance area and a user specified time period or span.

The trail formed from the plurality of trail markers may be based on a time instant of the result(s) of the search. The mapping of the trail markers may be based on the time instant comprising the result(s) of the search and the corresponding geo-positions of the moveable camera.

The trail markers may be displayed, i.e. mapped, on the geo-map based on the results of the search. That is to say that the trail formed from the plurality of trail markers may comprise the time instant of the result of the search. A trail marker or trail markers associated with the result or results of the search may be differentiated from the trail markers not associated with the results of the search. For example, an indicia or different shape may be used to indicate the trail marker(s) associated with the result(s) of the search. A trail marker associated with a search result may be considered a trail marker which indicates a time instant of the result of the search, for example the time instant which comprises the target object, target activity or target incident. The trail marker associated with a search result may be considered a trail marker which precedes the time instant of the result of the search, for example the time instant which comprises the target object, target activity or target incident. This way the associated trail marker may be easily identified and selected to view the result of the search.

One or more of the trail markers from the plurality of trail markers may represent future time instances or time periods relative to the time instant of the identified at least one of a target object, a target activity and a target incident.

The video management system may be for use in a video surveillance system. That is to say that it may be used to monitor video from one or more surveillance sites to ensure security. The video management system may be used to view live video, near-live video or recorded video. The video management system used in a video surveillance system may be referred to as a video surveillance management system.

Each trail marker is capable of being actuated by a user. Put another way each trail marker is selectable by a user. Each trail marker is a selectable element within the GUI which can be interacted with by a user using known means, for example, by using an input device, such as a mouse.

A second aspect of the present disclosure relates to a video surveillance system that comprises a video management system according to above described aspects thereof.

The video surveillance system may comprise one or more stationary video cameras arranged at respective geo-positions of the surveillance area to generate respective one or more video streams and associated metadata streams; and a video management system according to any of above-outlined embodiments thereof and configured to receive the one or more video streams and associated metadata streams.

A third aspect of the present disclosure relates to a computer-implemented video management method for a video surveillance system, comprising steps:

receive, at a video management system, a first video stream and associated first metadata stream supplied by a first movable video camera, determine a first trail of the first movable video camera within the surveillance area based on geographical position data and corresponding time data of the first metadata stream, generate and display a geo-map of the surveillance area via the user interface window, map the first trail onto the geo-map using a plurality of first trail markers represented by a first type of visual symbols, monitor the plurality of first trail markers for user actuation, respond to an actuated first trail marker by displaying the first video stream that corresponds to a geographical position and time instant of the actuated first trail marker.

The computer-implemented video management method may comprise further steps of:

enter a user defined search query, or an automatically generated search query, for identifying at least one of a target object, a target activity and a target incident of the first video stream at a geo-position and time instant within the surveillance area, display the first video stream that corresponds to the identified at least one of a target object, a target activity and a target incident in the user interface window.

The computer-implemented video management method may comprise further steps of:

store the first video stream and associated first metadata streams in a video data repository and in a metadata repository, respectively, subsequent to receipt of the first video stream and associated first metadata stream, retrieve and search the first video stream and associated first metadata stream to identify the at least one of a target object, a target activity and a target incident by entering a user defined search query, or an automatically generated, search query, map the first trail onto the geo-map corresponding to the retrieved first video stream and associated first metadata stream wherein the geo-map comprises one or more first trail markers representing future time instants or time periods relative to the time instant of the identified at least one of a target object, a target activity and a target incident.

The processing unit of the video management system may comprise a plurality of stored microprocessor executable program instructions configured to at least carry out one or more of the above-outlined steps of the computer-implemented video management method.

BRIEF DESCRIPTION OF THE DRAWINGS

The above and other aspects will be apparent and elucidated from the embodiments described in the following with reference to the drawings in which.

DETAILED DESCRIPTION

Figure 1:
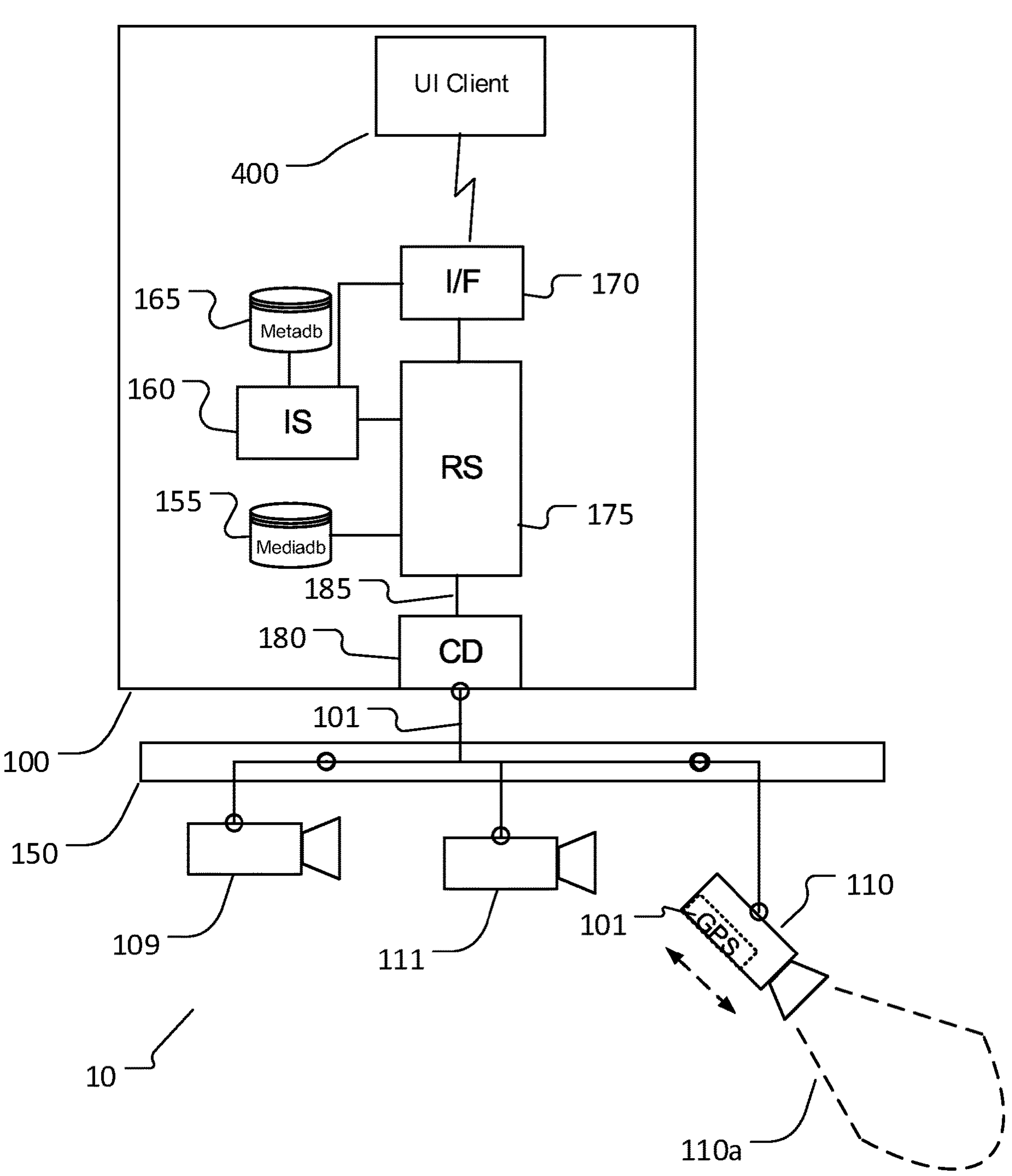
FIG. 1 is a schematic block diagram of an exemplary video surveillance system in accordance with some embodiments of the present disclosure.

FIG. 1 is a schematic block diagram of an exemplary video surveillance system 10. The video surveillance system 10 comprises one or more movable video cameras 110 communicatively connected to a video management system (VMS) 100 via respective wired or wireless communication links or connections 150.

Some embodiments of the video surveillance system 10 may comprise a mix of movable video cameras and stationary video cameras for example at least one movable video camera 110 and a plurality of optional stationary video cameras 109, 111. The plurality of optional stationary video cameras 109, 111 are typically distributed across a predetermined area or space where surveillance is desired, i.e. surveillance area. The number and position/location of the optional stationary video cameras 109, 111 as well as the type of video camera comprised therein may be selected based on factors such as a level of surveillance desired, a size of the surveillance area or facility and/or the complexity of the layout of the surveillance area or facility. Each of the optional stationary video cameras 109, 111 may provide surveillance in respective particular geographical zones, or sub-sections, of the surveillance area. The movable video camera(s) 110 has a Field of view (FOV) 110*a* and the stationary video cameras 209, 111 have respective FOVs (not shown). The FOV is the open, observable area of the camera in question as schematically illustrated by a pie-shaped outline 110*a* of the movable video camera 110. The skilled person will appreciate that different types of video cameras may have different FOVs for example caused by different optical properties of camera lenses.

In the present specification, the term "movable" as a property of a video camera means the camera can be moved, i.e. is geographically dynamic, while carrying out video recording and/or live video streaming. The video recording and/or live video streaming is often carried out during active operation of the video surveillance system 10 and its VMS 100. The movable video camera 110 is for example displaced along a certain path or trail of the surveillance area. A stationary video camera like optional cameras 109, 111 is typically fixed to a stationary structure, like a building wall or a pole in the surveillance area.

The movable video camera 110 may travel along a path or trail of the surveillance area via mounting to any suitable support structure of various types of vehicles for example motorized vehicles like cars, trucks, busses, trains, motorcycles, drones etc. The movable video camera 110 may be moved along the path or trail of the surveillance area by being mounted on, or worn by, a person via a suitable support like a belt etc. The person may for example be a police officer, bus driver, fireman etc. In the latter situation the movable video camera 110 is transported through the surveillance area when the person walks or runs. Alternatively, the movable video camera 110 may be transported via the vehicle's travel when the person wearing the movable video camera 110 is a driver or passenger of the vehicle.

The one or more movable video camera(s) 110 may be conventional portable video camera(s) known as such in the art of video surveillance. It will be appreciated that the video surveillance system 10 may include a plurality of movable video cameras of the same type and/or different types. Different types of movable video cameras of the video surveillance system 10 may for example be tailored to specific operation schemes and placements, e.g. fixed to a truck or on-person fixations. The movable video cameras of different types may be configured to supply video streams of different resolution, in different formats or outputting additional metadata associated with the video stream. Examples of functions of the movable video cameras may include one or more of the following: video streaming, in particular live streaming, and/or video recording and audio streaming and/or audio recording. The video streaming and/or video recording may be carried out in visible wavelength ranges and/or in infrared wavelength ranges, such as near-infrared wavelength ranges. The moveable video camera(s) and optional stationary video cameras may comprise various control functions such as pan or zoom, image processing capabilities, motion detection, etc.

The respective video streams supplied by the stationary video cameras 109, 111 as well as those of the one or more movable video cameras 200 are associated with corresponding metadata streams. The metadata stream may be a separate stream from the associated video stream but originating from either the same video camera or another device mounted on the same person or vehicle as the associated video camera. The metadata stream associated with each video stream preferably includes time data or stamps together with corresponding position data associated with the video camera in question. This property allows time synchronization of the video streams and metadata streams at the VMS 100. The respective geolocations of the stationary video cameras 109, 111 and those of the one or more movable video cameras 110 may be derived from the position data supplied by a video camera associated with a GPS unit or similar position detecting device. The associated GPS unit or device of a movable or stationary video camera may be built into the video camera as schematically illustrated by GPS device 101 of the movable video camera 110, or may fixed to a vehicle or person carrying the movable video camera in question.

The optional stationary video cameras 109, 111 as well as the one or more movable video cameras 110 are often communicatively connected to the video management system (VMS) 100 as mentioned above for example connected via a local area network 150 or in any other suitable manner, e.g. via point-to-point wired and/or wireless connections, or the like. For example, the optional stationary video cameras 109, 111 may be connected to the VMS via an Ethernet connection. The one or more movable video cameras 110 may often be wirelessly connected to the VMS 100 for example through a wireless network like Wi-Fi, a 4G and/or 5G network. However, one or more of the movable video cameras 110 may alternatively be configured to record the video stream during active operation where the video camera is transported through the surveillance area. In the latter scenario, the recorded video stream may be transferred to, or off-loaded at, a media repository 155 of the VMS 100 at the time of return to an associated station. In the latter use case, the video stream may be offloaded at regular time intervals for example when a camera user or cameral vehicle such as a bus driver or police officer returns to the station.

The skilled person will understand that some exemplary video surveillance systems may include additional sensors providing sensor signals and/or media streams different from video streams, such as audio signals, radar signals, Lidar signals, etc.

The VMS 100 is preferably configured to store the received video streams in the media repository 155. The VMS 100 provides an interface 170 for accessing live video streams as well as the previously discussed associated metadata streams. The interface 170 may further be configured to access video streams and associated metadata streams stored in the media repository 155. The interface 170 may implement different types of interfaces. For example, the interface may provide an application interface, e.g. in the form of a software development kit and/or one or more communication protocols, such as a suitable messaging protocol, e.g. SOAP, XML, etc. Accordingly, the interface may operate as a gateway to different types of systems. The VMS may be configured to implement various types of processing of received live video streams and/or recorded and retrieved video streams for example object detection, object recognition, motion detection etc.

The media repository 155 may comprise a media database or other suitable storage device for storing media content. The VMS 100 may include a user interface client (UI client) 400, for example configured to provide a user interface window 215, 315, 415 (shown on FIGS. 2, 3 and 4), displayed on a suitable user screen or screens of the VMS 100. The user interface window enables VMS users to see live video streams and/or stored and retrieved video streams and/or to control operation of one or more of the optional stationary video cameras 109, 111 and/or control operation of the one or more movable video cameras 110. The content and structure of data items displayed through the user interface may be configurable by the operator via control buttons etc. The user interface preferably comprises a map component integrated in the VMS 100. The map component is utilized to build or provide a geo-map of at least a part of the surveillance area, for example a geographical zone, subsection of the surveillance area, for presentation on the user screen via the user interface window. The map component may be configured to present a geo-map overview of the respective geo-positions of the one or more moveable video cameras 110 and optionally also the respective geo-positions of the optional stationary video cameras 109, 111.

The VMS 100 may be embodied as one or more software program(s) comprising respective computer executable instructions configured for execution on a suitable data processing system, e.g. by one or more server computers. The data processing system implementing the VMS is typically arranged remote from the one or more movable video cameras 110 as the latter often travel over a large geographical area for example through a route or trail comprising various streets, roads, parking lots and other facilities. The route or trail may cover a city neighbourhood or even an entire city. The video streams from the movable video camera(s) may be transmitted to the VMS 100 over wireless public or other wireless communications networks. Alternatively, the movable video camera(s) 110 of the video surveillance system 10 may move in relative proximity to a locally arranged on-site VMS 100 for example in a manufacturing facility, residential or office buildings, shopping centre etc.

The VMS 100 may comprise one or more camera drivers 180 for providing interfaces to respective types of stationary and movable video cameras. Different types of these video cameras may provide their respective video streams in different formats, e.g. using different encoding schemes and/or different network protocols. Similarly, different cameras may provide different interfaces for camera control such as zoom or pan. Accordingly, the VMS 100 may include a plurality of different camera drivers 180 configured to cooperate with respective camera types. In particular, the camera drivers 180 may implement one or more suitable network protocols and/or other communications standards for transmitting data between movable and stationary video cameras and/or other peripheral devices and data processing systems. Examples of such protocols and standards include the Open Network Video Interface Forum (ONVIF) standard and the Real Time Streaming Protocol (RTSP).

The camera drivers 180 may further be configured to add one time stamp to each frame of the received video streams 101 so as to ensure that the video streams, which are stored and subsequently supplied by the VMS 100, include a uniform time stamp. The added time stamp will also be referred to as a canonical time stamp. The canonical time stamp is indicative of the time of receipt, by the VMS 100, of the respective video streams from the respective stationary and movable video cameras. The camera drivers thus provide uniformly time-stamped input video streams each time-stamped input video stream 185 corresponding to a respective one of the received video streams.

The VMS 100 comprises a recording server 175. The recording server may be embodied as a software program module executed by a suitable data processing system, e.g. by one or more server computers. The recording server receives the inputted video streams 185 originating from the respective stationary and movable video cameras through the corresponding camera drivers 180. The recording server stores the received inputted video streams in a suitable media storage device, such as a suitable media database. It will be appreciated that the media repository 155 may be part of the VMS 100 or it may be separate from, but communicatively coupled to the VMS. The media repository 155 may be implemented as any suitable mass storage device, such as one or more hard disks or the like. The storing of the received video streams is also referred to as recording the received video streams. The recording server may receive and store additional data associated with received video streams such as the previously discussed metadata stream.

The VMS 100 may store the generated metadata in a suitable metadata repository 165, such as a suitable metadata database, which may be separate from, or integrated into, the media repository 155. To this end, the VMS 100 may include an index server 160. The index server 160 may be embodied as a software program module executed by a suitable data processing system, e.g. by one or more server computers. The index server may receive metadata and store the received metadata in the metadata repository 165. The index server may further index the stored metadata so as to allow faster subsequent search and retrieval of stored metadata. During searches through the stored video and metadata streams the metadata repository 165 may be accessed through the interface 170 and index server 160. The UI client 400 may query the index server 160 through the interface 170 and return matching search results. The UI client 400 may be configured to respond to receipt of the matching search results by determining the corresponding position data of the metadata stream in question. The UI client 400 may be configured to utilize the time stamps of the metadata stream in question to find the positions on the geo-map that correspond to the matching search results.

Figure 2:
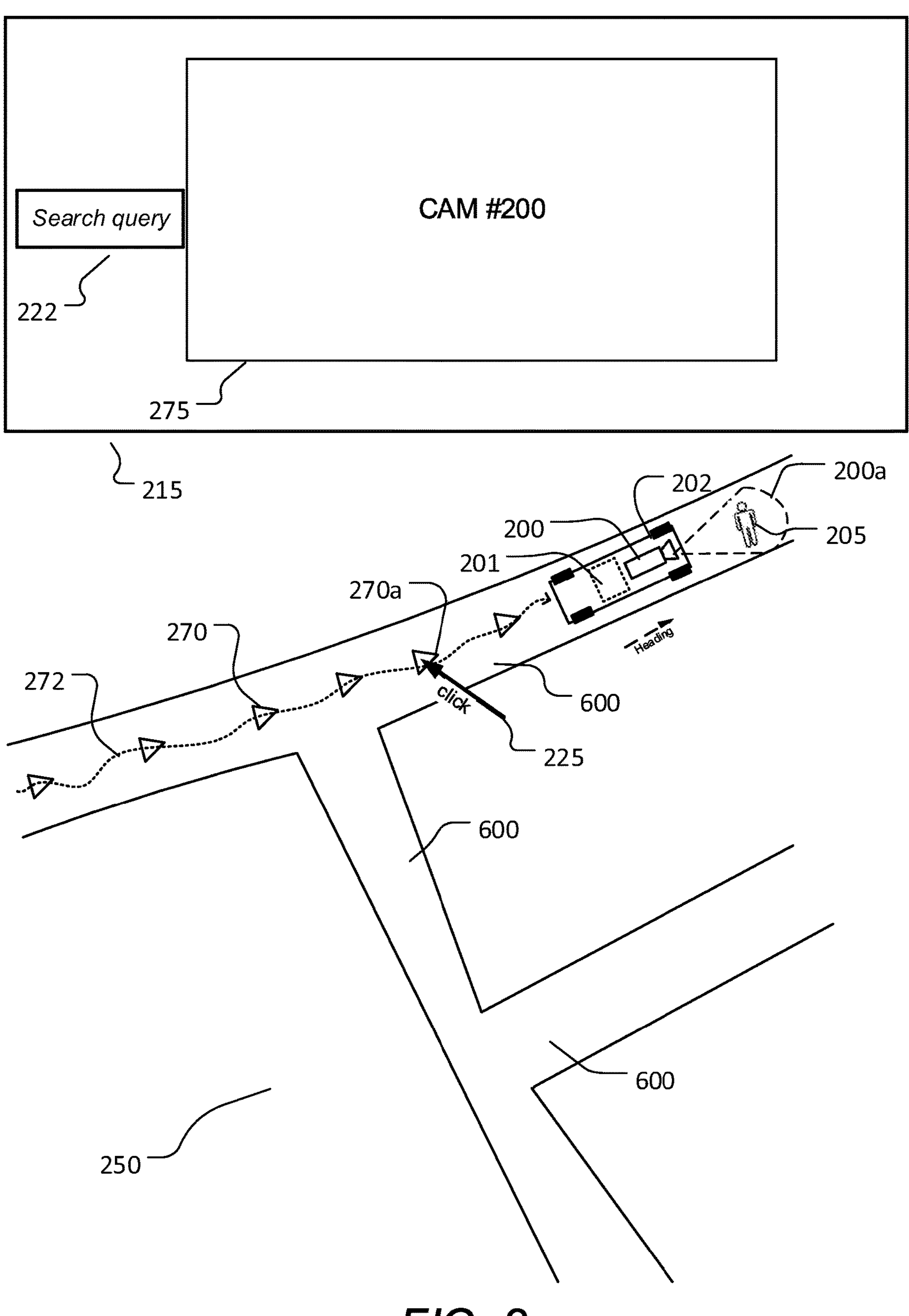
FIG. 2 illustrates on the upper and lower sections an exemplary schematic user interface window of a first embodiment of a video management system as displayed on a UI client.

The lowermost section of FIG. 2 illustrates an exemplary and schematic geo-map 250 of a surveillance area taken at a particular time instant of interest. The uppermost section of FIG. 2 shows an exemplary user interface window 215 of the VMS 100 associated with the geo-map in schematic form. The exemplary user interface window 215 may be displayed via a suitable screen or display of the UI client 400 on FIG. 1. The user interface window 215 may be presented to an operator or user of the VMS 100.

The moveable video camera 200 may be mounted to a suitable support structure of an exemplary vehicle 202 for example motorized vehicles like cars, trucks, busses, trains, motorcycles etc. to be moved or transported along a path or trail 272 of the geo-map area 250. The movable video camera 200 may alternatively be moved or transported along the trail 272 of the area by way of mounting on, or worn by, a person via a suitable support like a belt etc. The movable video camera 200 has a travel direction, or heading, along the road section 600 as schematically indicated by the heading arrow.

The processing unit is configured to generate the geo-map 250 of the surveillance area and display the geo-map 250 on the user interface window 215. The trail 272 of the movable video camera 200, as determined by the processing unit, is represented by a plurality of first trail markers 270 that are represented by a first type of visual symbols, e.g. open triangles. The skilled person will understand that multiple alternative types of symbols may be used by the processing unit as the first trail markers for example rectangles, stars, circles etc. The type of symbol should preferably possess an intuitive visual differentiation to other features of the geo-map and may for example use a particular coloring of the visual symbols.

The processing unit is configured to determine the trail 272 of the movable video camera 200 by utilizing position data and corresponding time data of the associated first metadata stream. Each of the first trail markers 270, 270*a* of the trail 272 on the geo-map 250 may correspond to a particular geo-position and time instant reported by the associated position detecting unit 201 of the vehicle 202. The skilled person will appreciate that one or more of the geo-positions of the first trail markers 270, 270*a* may be determined by the processing unit by use of interpolation and/or extrapolation algorithms between a plurality of discrete position data and time data reported by the associated position detecting unit 201 of the vehicle 202.

The processing unit is configured to monitor the first trail markers 270, 270*a* for a user actuation thereof for example by a screen pointing device like a mouse click or pressing on a touch-sensitive screen. The processing unit is further configured to present a first video stream that corresponds to the geographical position and time instant of the actuated trail marker 270*a*. This actuation of the first trail marker 270*a* is schematically indicated by an arrow 225 as actuation device. The processing unit is preferably configured to display a corresponding time instant or period of the first video stream in response to the actuation of the first trail marker 270*a* in a first tile 275 the UIW 215.

The position and time instance, or time period, of the first movable video camera 200 associated with the first video stream may be derived from a search result or hit of a particular search query entered into the processing unit of the VMS 100 by the operator for example via a search window or box 222 of the UIW 215. The search query may be applied to live video streams, i.e. real-time streaming, or may be applied to previously stored and later retrieved video streams as discussed in further detail below with reference to FIG. 4.

The search query aims at identifying a particular object or incident, say a target object like a red sedan car, a road accident, a person with certain characteristics etc. within a specified zone and time period or span. In the present example, the target object is depicted by a person 205 for simplicity. The person 205 is arranged in a field-of-view (FOV) 200*a* of the movable video camera 200 at the specified time instant and particular geo-position on the trail 272 to generate a search hit or result in the corresponding video stream.

The user is able to monitor the first trail markers 270, 270*a* on the geo-map 250 using the UIW 215 and quickly identify past geo-positions of the vehicle 202 and associated video camera 200. The marking of the continuous trail 272 on the geo-map is optional but may serve to further augment visual indications already made by the first trail markers 270, 270*a*. This visual presentation of the first trail markers 270, 270 on the geo-map 250 via the UIW 215 allows the user to jump back to prior time instant or periods and corresponding geo-positions of the movable video camera 200 relative to the time instant and geo-positions of search results like the target person 205. The user is accordingly provided with an intuitive and fast access to locate and investigate incidents and/objects of interest before the search hit in question for example the illustrated target person 205.

Figure 3:
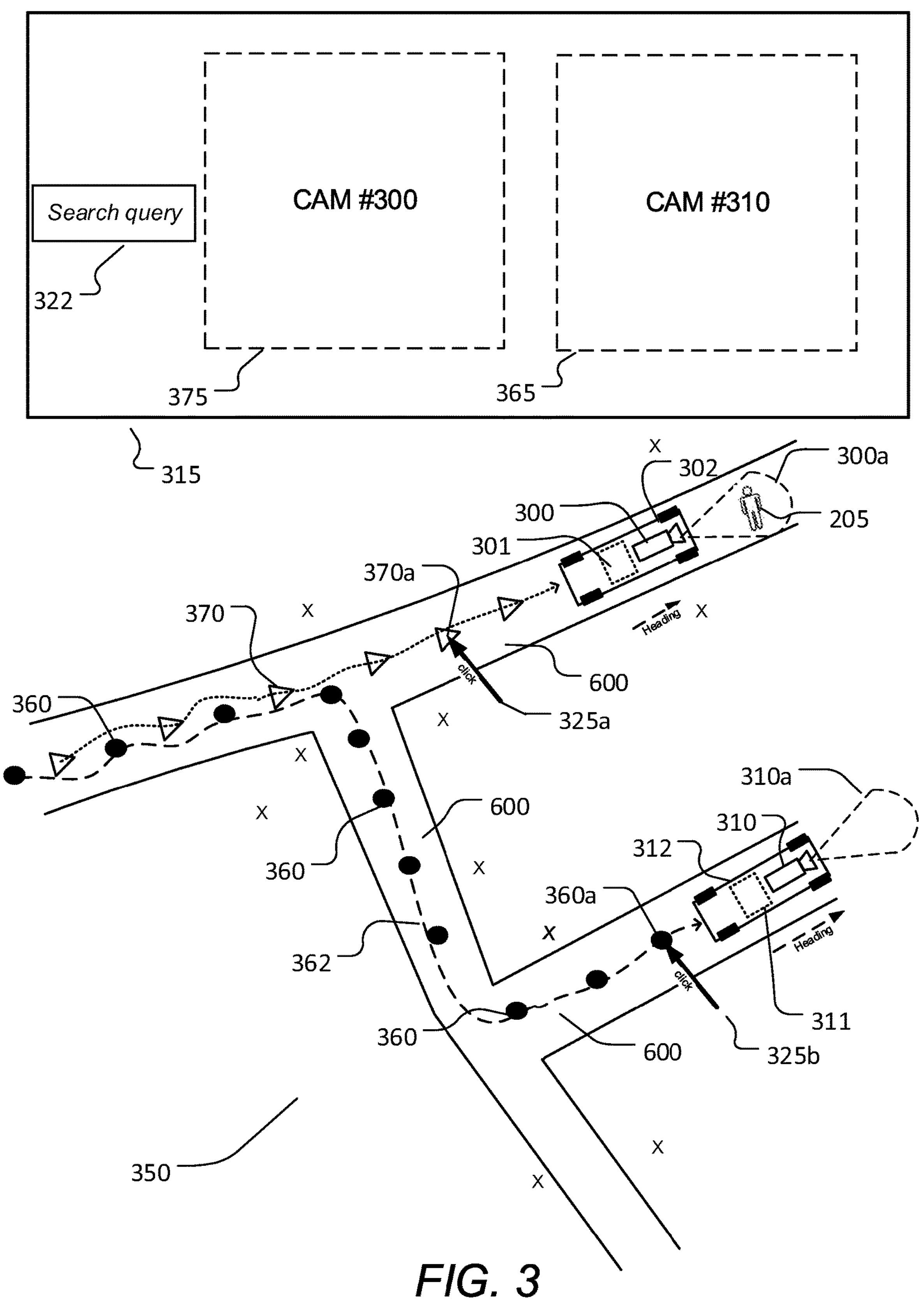
FIG. 3 illustrates on the upper and lower sections an exemplary schematic user interface window of a second embodiment of the video management system as displayed on a UI client.

FIG. 3 illustrates second embodiment of a video management system configured to handle respective video streams and metadata streams of at least two moveable video cameras, i.e. a first camera 300 and a second camera 310 according to a second embodiment of the present disclosure. An exemplary geo-map 350 of a surveillance area of the corresponding video surveillance system taken at a particular time instant of interest is depicted schematically on the lowermost section.

The skilled person will appreciate that corresponding features, structures and functions to those of the first embodiment on FIG. 2 are given corresponding reference numerals and will not necessarily be described in connection with the present embodiment for brevity.

The uppermost section of FIG. 3 shows an exemplary user interface window (UIW) 315 of the VMS 100 in schematic form. The exemplary user interface window 315 may be displayed via a suitable screen or display of the UI client 400 on FIG. 1. The video surveillance system further comprises a plurality of optional stationary video cameras marked schematically by "x". The plurality of optional stationary video cameras are typically distributed across a predetermined area or space where surveillance is desired. The video management system may be configured to receive respective video streams and metadata streams associated with the optional stationary video cameras and for example display one or more video streams in the UIW 315. The video management system may identify and select one or more stationary video cameras positioned nearby the movable video camera in question at the relevant time instant and geo-position thereof to obtain additional video stream footage of an incident or object of interest.

The processing unit is configured to generate the geo-map 350 of the surveillance area and display the geo-map 350 on or via the UIW 315. The first trail markers 370, 370*a* of the first trail 372 on the geo-map 350 may correspond to respective geo-positions and time instants reported by the associated position detecting unit 301 of the first vehicle 302 via the first metadata stream. The processing unit is configured to map the plurality of first trail markers 370, 370*a* at their respective geo-positions on the geo-map 350. The first trail markers 370, 370*a* are represented by a first type of visual symbols, e.g. open triangles as indicated.

The processing unit is further configured to receive a second video stream supplied by the second movable video camera 310 attached to the second movable vehicle 312. The second movable video camera 310 is configured for travelling through the surveillance area in a similar manner to the first movable video camera 300, albeit typically along an independent trail 362 as indicated by a plurality of second trail markers 360, 360*a*. The second trail markers 360, 360*a* on the geo-map 350 may correspond to respective geo-positions and time instants reported by the associated position detecting unit 311 of the second vehicle 312 via the second metadata stream. The second markers 360, 360*a* are represented by a second type of visual symbols, e.g. filled-out dots/circles as indicated to create a clear and distinct visual difference between the first and second trails.

The processing unit is configured to monitor the first trail markers 370, 370*a* for a user actuation thereof for example by a screen pointing device like a mouse click or pressing on a touch-sensitive screen. The processing unit is further configured to present a first video stream that corresponds to the geographical position and time instant of the actuated trail marker 370*a* of the first trail 372. This actuation of the first trail marker 370*a* is schematically indicated by an arrow 325*a* as actuation device. The processing unit is preferably configured to display the corresponding time instant or period of the first video stream in response to the actuation of the first trail marker 370*a* in a first tile 375 of the UIW 315.

The processing unit is in a similar manner configured to monitor the second trail markers 360, 360*a* for a user actuation thereof. The processing unit is further configured to present a second video stream that corresponds to the geographical position and time instant or period of the actuated trail marker 360*a* of the second trail 362. This actuation of the second trail marker 360*a* is schematically indicated by an arrow 325*b* as actuation device. The processing unit is preferably configured to display the corresponding time instant or period of the second video stream in response to the actuation of the second trail marker 360*a* in a second tile 365 of the UIW 315. The skilled person will understand that the layout of UIW 315 is an exemplary embodiment where the first and second tiles 375, 365 are rectangular with largely similar dimensions. Numerous alternative shapes, dimensions and locations of the first and second tiles 375, 365 within the UIW 315 may be utilized for example depending on the number of movable cameras, other features and tiles of the UIW etc.

Figure 4:
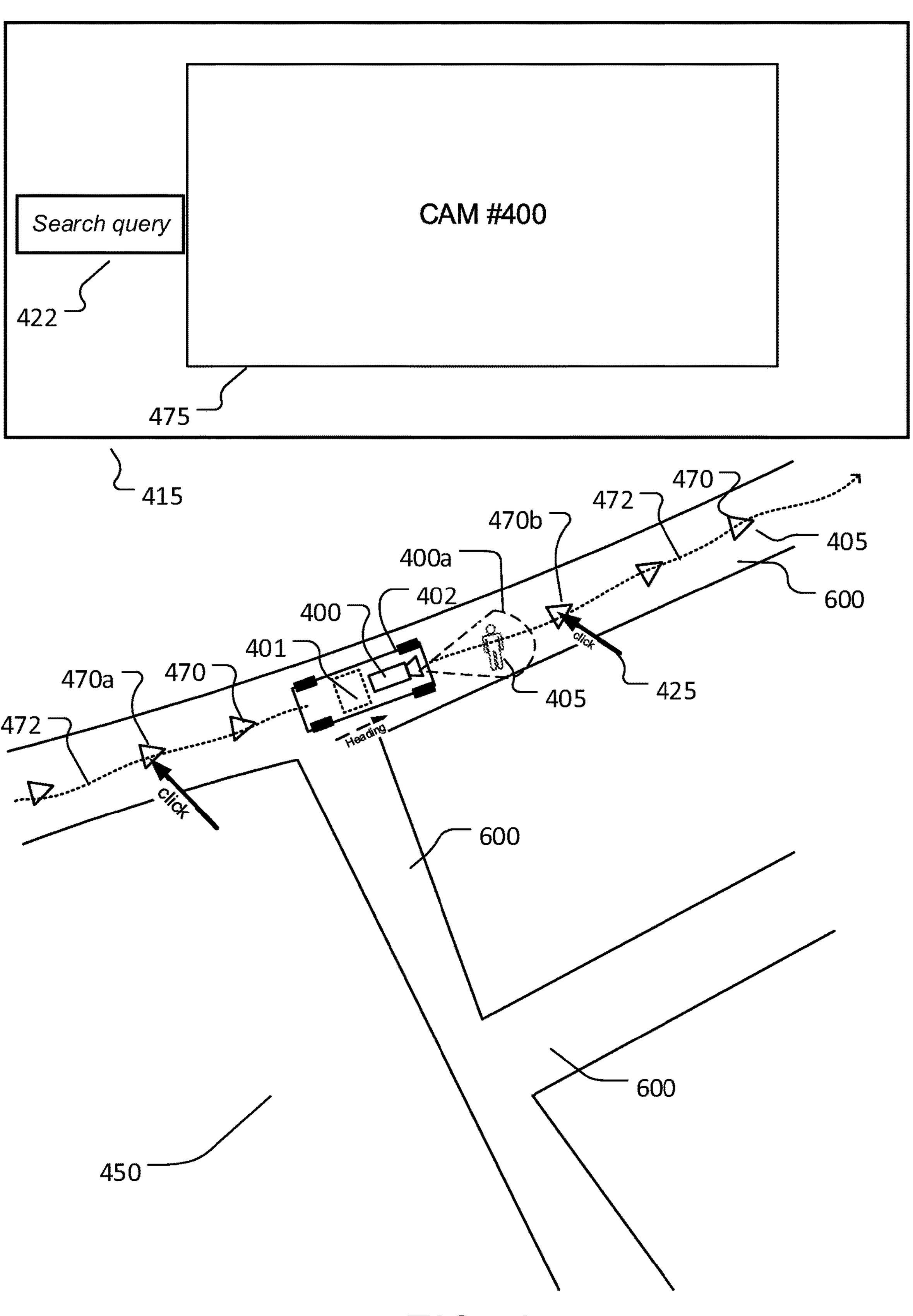
FIG. 4 illustrates on the upper and lower sections an exemplary schematic user interface window as displayed on the UI client of a third embodiment of the video management system.

FIG. 4 illustrates third embodiment of a video management system configured to handle respective video streams and metadata streams of one or more moveable video cameras, i.e. at least a first camera 400 according to a third embodiment of the present disclosure. An exemplary geo-map 450 of a surveillance area of the corresponding video surveillance system taken at a particular time instant of interest is depicted schematically on the lowermost section.

The skilled person will appreciate that corresponding features, structures and functions to those of the first embodiment on FIG. 2 are given corresponding reference numerals and will not necessarily be described in connection with the present embodiment for brevity.

The processing unit is configured to generate the geo-map 450 of the surveillance area and display the geo-map 450 on to the user via UIW 415. A trail 472 of the movable video camera 400 as determined by the processing unit is represented by a plurality of first trail markers 470, 470*a*, 470*b* represented by e.g. open triangles as indicated. The processing unit is configured to determine the trail 472 of the movable video camera 400 by utilizing position data and corresponding time data of an associated first metadata stream. Each of the first trail markers 470, 470*a*, 470*b* of the trail 472 on the geo-map 450 may correspond to a particular position and time instant reported by the associated position detecting unit 401 of the vehicle 402 following similar functions to those discussed above.

The position and time instant, or time period, of the first movable video camera 400 associated with the first video stream may be derived from a search result or hit of a particular search query entered into the processing unit of the VMS 100 by the operator for example via a search window or box 422 of the UIW 415. The present exemplary search query leads to the identification of the search object 405 e.g. a person at a particular time instant and geo-position on the trail 472.

The present processing unit is configured to additionally retrieve and search through previously stored video frames or sections of the first video stream, i.e. non-live frames, from the earlier discussed video repository of the VMS. The processing unit is configured to map the first trail onto the geo-map 450 corresponding to the retrieved frames and sections of the first video stream. This feature allows the processing unit to not only map those first trail markers 470, 470*a* that represent geo-positions and time instants of the past, i.e. to the left of vehicle 420, but additionally map those first trail markers 470*b* that represent future geo-positions and time instants of the search object 405 relative to the geo-position and time instant.

Using a similar scheme as discussed in the previous embodiments, the processing unit is configured to monitor each of the first trail markers 470, 470*a*, 470*b* for a user actuation thereof for example by a screen pointing device. The processing unit is further configured to display or present the first video stream on the first tile 475 of the UIW 415 where the first video stream corresponds to the geographical position and time instant of the movable camera 400 at the actuated first trail marker 470*a*. The latter video stream represents a past time instant or period. The processing unit further responds to actuation of the trail marker 470*b* that represents future geo-positions and corresponding time instants of the movable video camera 400 by displaying the corresponding time instant or period of the first video stream on the first tile 475 of the UIW 415.

Figure 5:
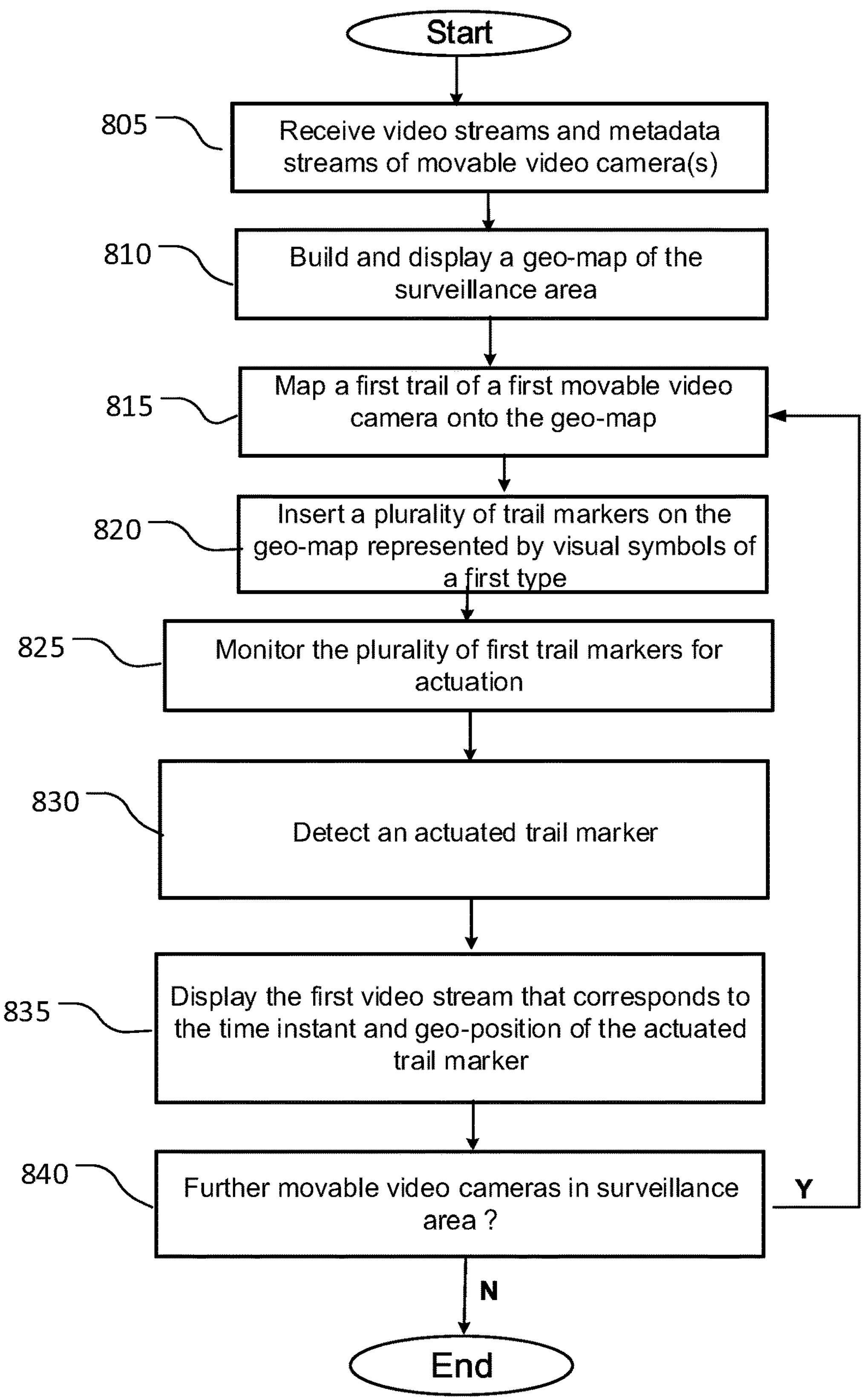
FIG. 5 shows a flow chart of an exemplary computer-implemented video management method that is suitable for the exemplary video management systems disclosed herein.

FIG. 5 shows a flow chart or diagram of an exemplary computer-implemented video management method, suitable for the previously disclosed surveillance systems and video management systems (VMS).

In step 805 a processing unit of the VMS receives a plurality of video streams and associated metadata streams supplied by one or more movable video cameras, and optionally one or more stationary video cameras.

In step 810 the processing unit builds or creates a geo-map of the surveillance area for example based on information from a suitable cloud-based geo-database.

In step 815 the processing unit determines and maps a first trail of a first movable video camera based on geographical position data and corresponding time data of a corresponding first metadata stream.

In step 820 the processing unit visually indicates the first trail by a plurality of first trail markers represented by a first type of visual symbols for example symbol shapes like stars, rectangles, triangles, dots etc.

In step 825 the processing unit monitors the plurality of first trail markers for user actuation for example by a mouse click, touch screen pressure etc.

In step 830 the processing unit detects an actuated first trail marker.

In step 835 the processing unit responds to the actuation by displaying the first video stream in a tile of the UIW wherein the first video stream corresponds to a geographical position and time instant of the actuated first trail marker.

In step 840 the processing unit checks whether there is additional movable video camera(s) in the surveillance area at the time instant and associated with the VMS. If yes, the processing unit jumps back to step 815 and carries out corresponding steps 815-835 for the further video camera(s).

While the present disclosure has been described with reference to embodiments, it is to be understood that the present disclosure is not limited to the disclosed embodiments. The present disclosure can be implemented in various forms without departing from the principal features of the present disclosure as defined by the claims. Such variations may derive, in particular, from combining aspects of the present disclosure as set forth in the above disclosure and/or in the appended claims.

Each feature disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The word "comprising" does not necessarily exclude other elements or steps, and the indefinite article "a" or "an" does not necessarily exclude a plurality. A single processing unit or multiple processing units or other unit may fulfil the functions of several items recited in the claims. The mere fact that different features are recited in mutually different dependent claims does not indicate that a combination of these features cannot be advantageously used. Any reference signs in the claims should not be construed as limiting the scope of the disclosure.

In the preceding embodiments, the functions described may be implemented in hardware, software, firmware, or any combination thereof. If implemented in software, the functions may be stored on or transmitted over, as one or more instructions or code, a computer-readable medium and executed by a hardware-based processor or processing unit.

The invention claimed is:

1. A video management system for use in a video surveillance system, comprising:

a processing unit configured to receive a first video stream and an associated first metadata stream, the first video stream being supplied by a first movable video camera configured for travelling through a surveillance area, and a user interface window configured to present the first video stream; wherein said processing unit is further configured to:

receive a search query for identifying at least one of a target object, a target activity and a target incident of the first video stream within the surveillance area, wherein the results of the search query comprises detection of the at least one of the target object, the target activity and the target incident in the first video stream at an identified time instant, determine a first trail of the first movable video camera within the surveillance area based on geographical position data from the first metadata stream and corresponding time data of the first metadata stream, generate and display a geo-map of the surveillance area via the user interface window, map the first trail onto the geo-map by providing a plurality of spaced apart first trail markers represented by a first type of visual symbols, wherein each first trail marker of the plurality of first trail markers indicates a discrete time instant and corresponding geo-position of the moveable camera along the trail, wherein at least one of the first trail markers is associated with the result of the search query and indicates the identified time instant, wherein each first trail marker of the plurality of first trail markers other than the first trail marker associated with the result of the search query represent either one of future geo-positions and future discrete time instants or past geo-positions and past discrete time instants, monitor the plurality of first trail markers for user selection of one of the plurality of first trail markers, respond to the selection of the one of the plurality of first trail markers by displaying the first video stream at a time instant that corresponds to a geographical position and discrete time instant of the selected first trail marker.

2. The video management system according to claim 1, wherein the processing unit is further configured to:

receive a second video stream and an associated second metadata stream, the second video stream being from a second movable video camera configured for travelling through the surveillance area, determine a second trail of the second movable video camera within the surveillance area based on geographical position data of the second metadata stream and corresponding time data of the second metadata stream, map the second trail onto the geo-map using a plurality of spaced apart second trail markers represented by a second type of visual symbols, monitor the plurality of second trail markers for user selection, respond to the selection of second trail marker by displaying the second video stream that corresponds to a geographical position and time instant of the selected second trail marker.

3. The video management system according to claim 2, wherein said processing unit is further configured to:

present the first video stream in a first tile of the user interface window present the second video stream in a second tile of the user interface window, and optionally present the geo-map in a third tile of the user interface window.

4. The video management system according to claim 2, wherein each of first type of visual symbols comprise at least one of a rectangle, a triangle and a circle and each of second type of visual symbols comprise at least one of a rectangle, a triangle and a circle.

5. The video management system according to claim 2, wherein each of the first type of visual symbols and each of the second type of visual symbols differ at least by respective colors.

6. The video management system according to claim 1, wherein said processing unit is further configured to:

display the first video stream that corresponds to the at least one of a target object, a target activity and a target incident in the user interface window.

7. The video management system according to claim 1, wherein the search query is a user defined search query or an automatically generated search query.

8. The video management system according to claim 1, wherein at least one trail marker of the plurality of trail markers corresponds to a geographical position determined from the first metadata stream.

9. The video management system according to claim 1, wherein at least some of the plurality of trail markers are interpolated based on a geographical position determined from the first metadata stream.

10. A video surveillance system comprising at least the first movable video camera and the video management system according to claim 1.

11. The video surveillance system according to claim 10, comprising one or more stationary video cameras arranged at respective geo-positions of the surveillance area to generate respective one or more video streams and associated metadata streams; and wherein said video management system is configured to receive the one or more video streams and associated metadata streams supplied by respective ones of the one or more stationary video cameras.

12. A computer-implemented video management method for a video surveillance system, comprising the steps of:

a) receive, at a video management system, a first video stream and an associated first metadata stream, the first video stream being supplied by a first movable video camera;

b) determine a first trail of the first movable video camera within the surveillance area based on geographical position data of the first metadata stream and corresponding time data of the first metadata stream;

c) search at least one of the first video stream and the first metadata stream to identify at least one or a target object, a target activity and a target incident at a geo-position and a time instant within the surveillance area, wherein the search is performed based on a search query, and wherein the results of the search query comprises detection of the at least one of the target object, the target activity and the target incident in the first video stream at an identified time instant;

d) generate and display a geo-map of the surveillance area via the user interface window;

e) map the first trail onto the geo-map by providing a plurality of spaced apart first trail markers represented by a first type of visual symbols, wherein each first trail marker of the plurality of first trail markers indicates a discrete time instant and corresponding geo-position of the moveable camera along the trail, wherein at least one of the first trail markers is associated with the result of the search query and indicates the identified time instant, wherein each first trail marker of the plurality of first trail markers other than the first trail marker associated with the result of the search query represent either one of future geo-positions and future discrete time instants or past geo-positions and past discrete time instants;

f) monitor the plurality of first trail markers for user selection of one of the plurality of first trail markers; and g) respond to the selection of the one of the plurality of first trail markers by displaying the first video stream that corresponds to a geographical position and discrete time instant of the selected first trail marker.

13. The computer-implemented video management method for a video surveillance system according to claim 12, further comprising the step of:

h) display the first video stream that corresponds to the identified at least one of a target object, a target activity and a target incident in the user interface window.

14. The computer-implemented video management method for a video surveillance system according to claim 13, further comprising the steps of:

store the first video stream and the associated first metadata streams in a video data repository and in a metadata repository, respectively, subsequent to receiving, at the video management system, the first video stream and the associated first metadata stream, the first video stream being supplied by the first movable video camera;

retrieve the first video stream and associated first metadata stream to identify the at least one of a target object, a target activity and a target incident according to searching the at least one of the first video stream and the first metadata stream to identify the at least one or the target object, the target activity and the target incident at the geo-position and the time instant within the surveillance area, wherein the search is performed based on the search query, map the first trail onto the geo-map corresponding to the retrieved first video stream and the associated first metadata stream wherein the map comprises one or more first trail markers representing future time instants or time periods relative to the time instant of the identified at least one of a target object, a target activity and a target incident.

15. A video management system for use in a video surveillance system, comprising:

a processing unit configured to receive a first video stream and an associated first metadata stream, the first video stream being supplied by a first movable video camera configured for travelling through a surveillance area, and a user interface window configured to present the first video stream; wherein said processing unit is further configured to:

determine a first trail of the first movable video camera within the surveillance area based on geographical position data from the first metadata stream and corresponding time data of the first metadata stream, generate and display a geo-map of the surveillance area via the user interface window, map the first trail onto the geo-map by providing a plurality of spaced apart first trail markers represented by a first type of visual symbols, wherein each first trail marker of the plurality of first trail markers indicates a discrete time instant at corresponding geo-position of the moveable camera along the trail, wherein at least one of the first trail markers is associated with a result of a search and comprises a detection of at least one of a search for a target object, a search for a target activity and a search for a target incident at an identified time instant, and wherein each first trail marker of the plurality of first trail markers other than the first trail marker associated with the result of the search query represent either one of future geo-positions and future discrete time instants or past geo-positions and past discrete time instants relative to identified time instant of the first trail marker associated with the result of the search query, monitor the plurality of first trail markers for user selection of one of the plurality of first trail markers, respond to the selection of the one of the plurality of first trail markers by displaying the first video stream that corresponds to a geographical position and discrete time instant of the selected first trail marker.

16. The video management system according to claim 15, wherein at least one trail marker of the plurality of trail markers corresponds to a measured geo-position of the movable camera determined from the first metadata stream and the associated time instant.

17. The video management system according to claim 15, wherein at least some of the plurality of trail markers are interpolated based on a geographical position determined from the first metadata stream.

18. The video management system according to claim 1, wherein the at least one of the first trail markers associated with the result of the search query is visually differentiated from the trail markers not associated with the result of the search query.

19. The video management system according to claim 1, wherein a direction of travel of the movable camera along the trail is indicated by the plurality of first trail markers.

* * * * *